Nov. 17, 1959  H. W. CHRISTENSON ET AL  2,912,884
TRANSMISSION
Filed Jan. 9, 1957  6 Sheets-Sheet 1
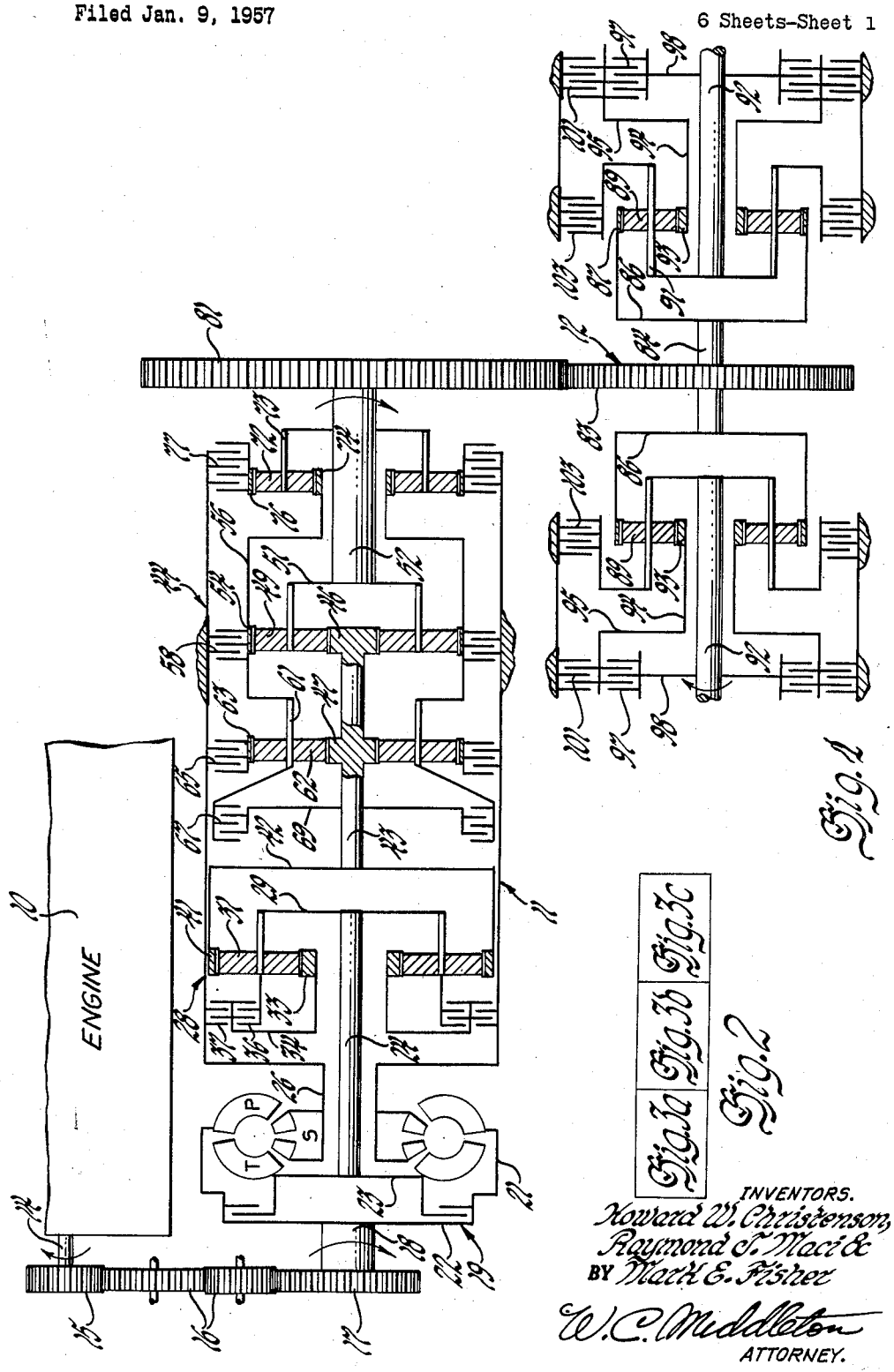

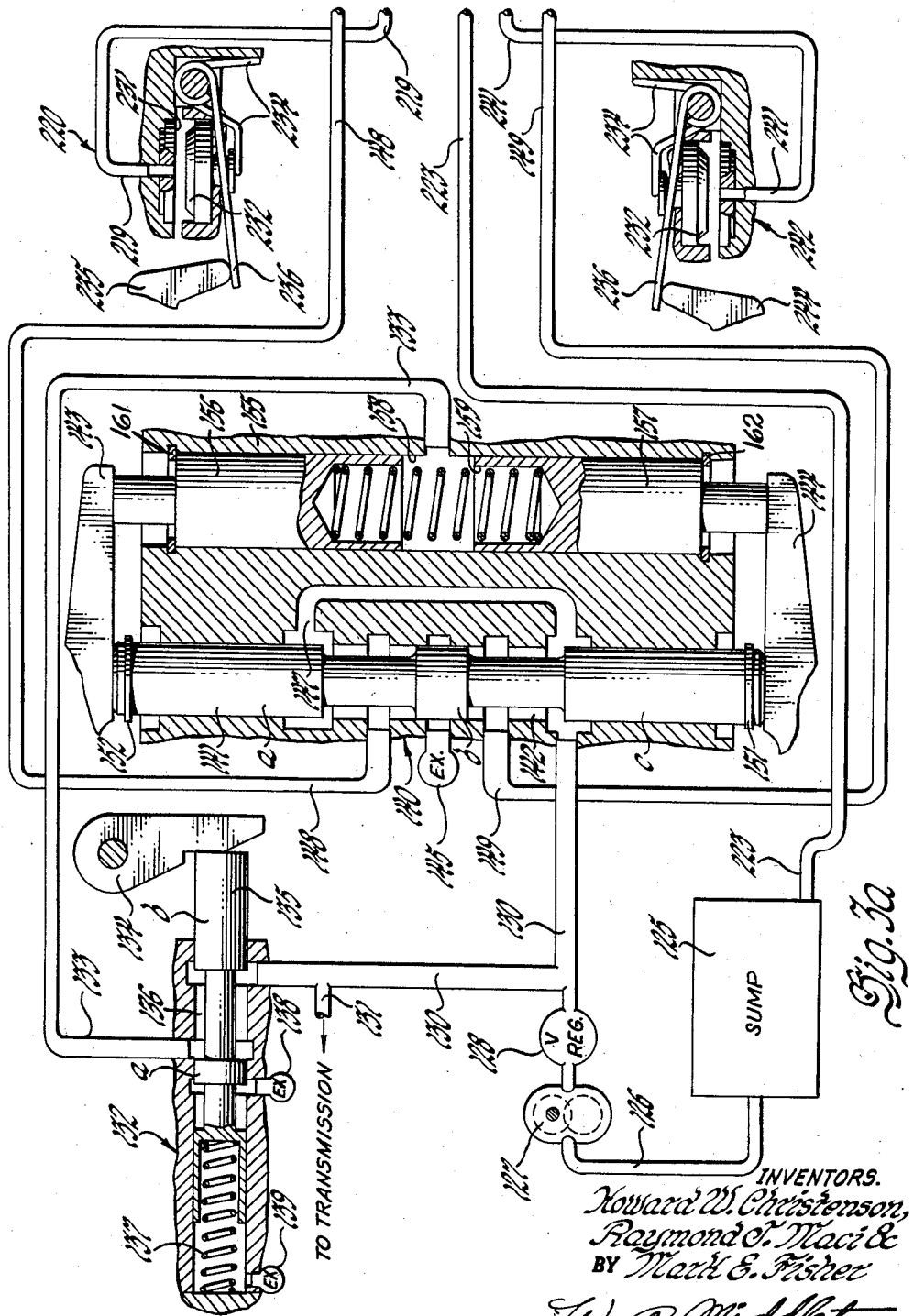

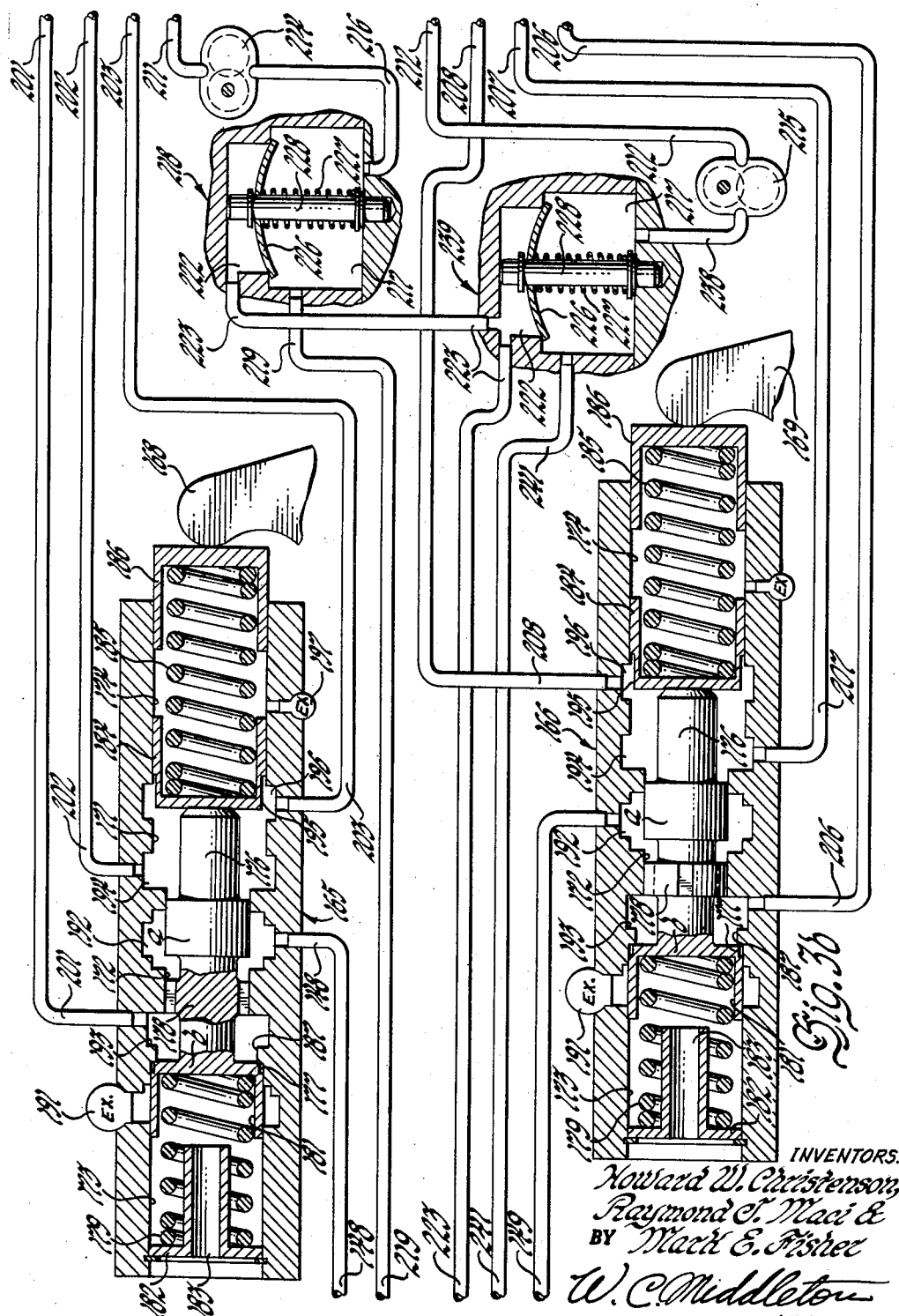

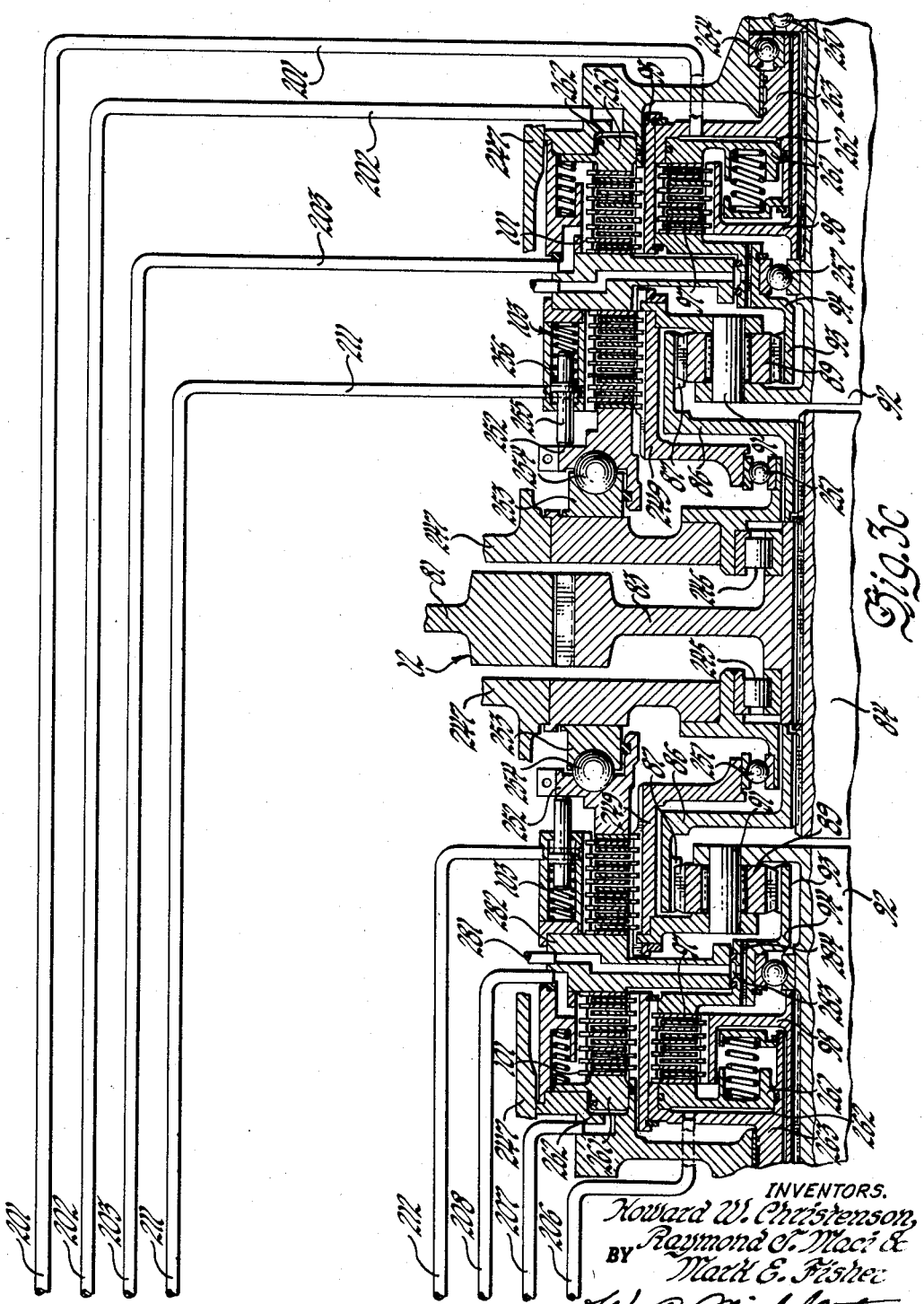

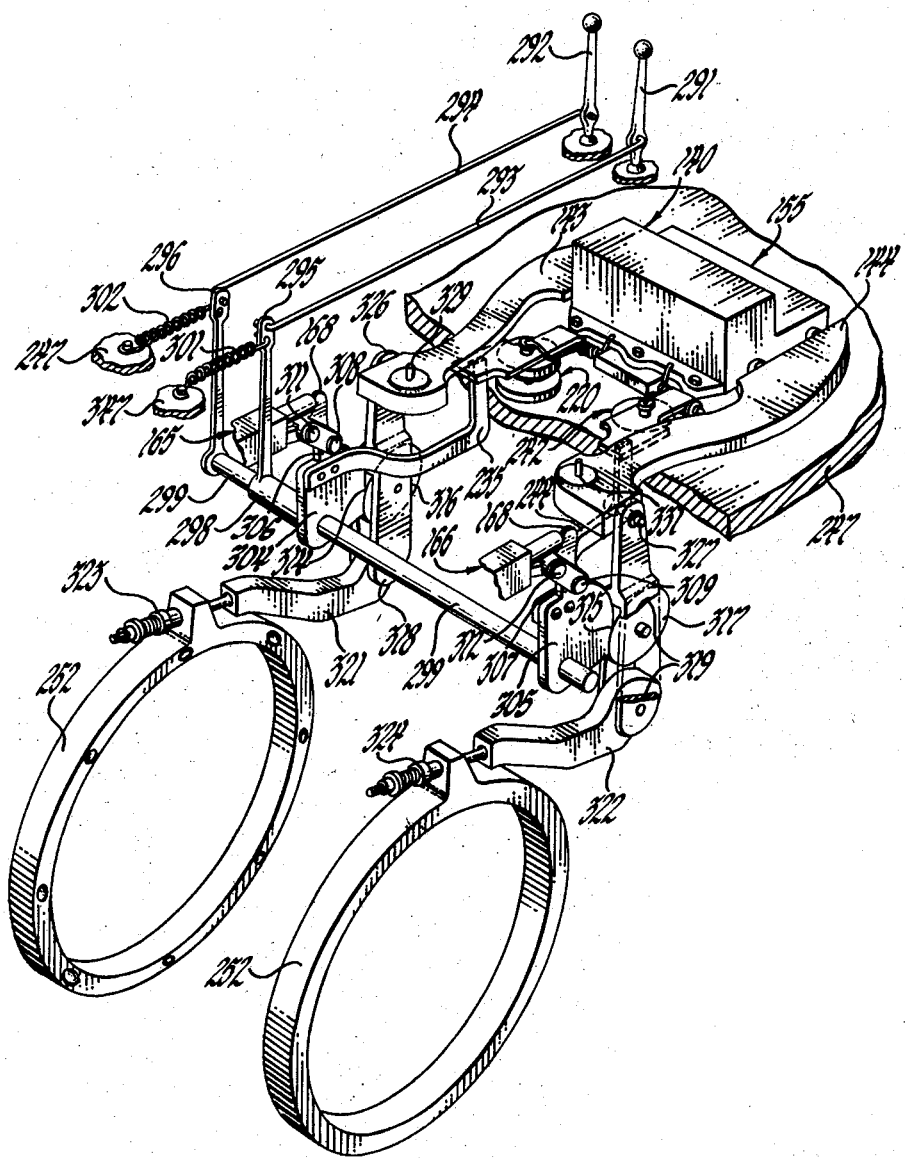

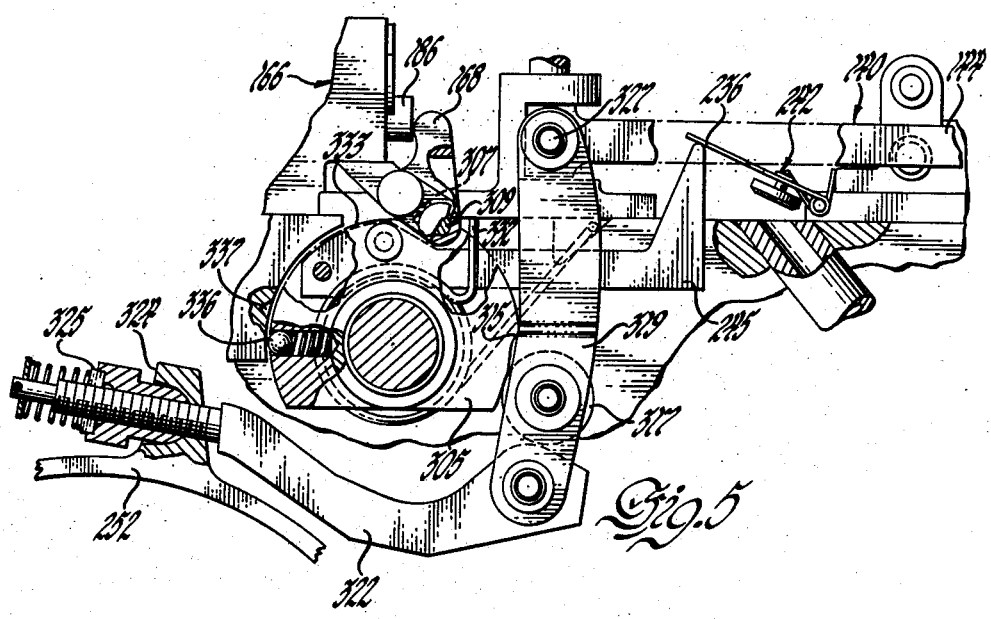
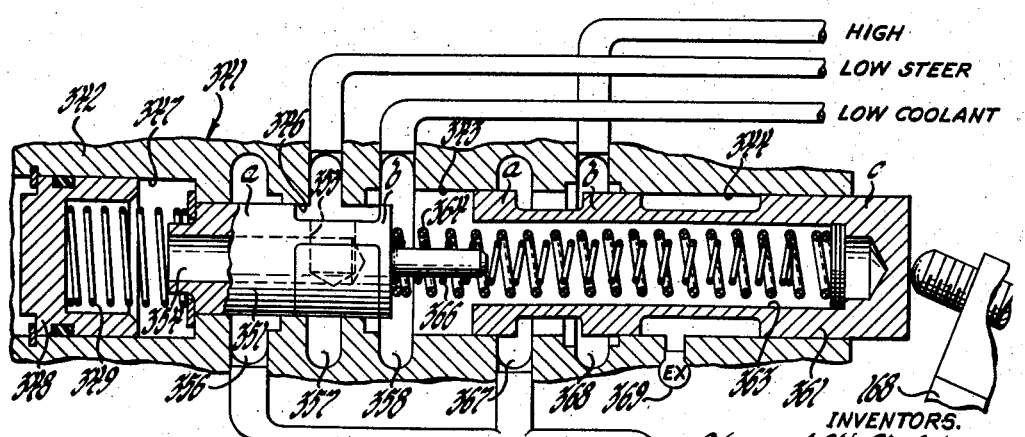

United States Patent Office 2,912,884
Patented Nov. 17, 1959

2,912,884

TRANSMISSION

Howard W. Christenson and Raymond J. Maci, Indianapolis, and Mark E. Fisher, Carmel, Ind., assignors to General Motors Corporation, Detroit, Mich., a corporation of Delaware Application January 9, 1957, Serial No. 633,300

28 Claims. (Cl. 74—759)

This invention relates to a vehicle power plant having a multiratio transmission, a cross drive transmission providing steering control and an automatic control system therefor.

The vehicle power plant consists of an engine, a multiratio transmission unit and a cross drive transmission unit with each of these units arranged in parallel relation transversely of the vehicle. The multiratio transmission unit provides a torque converter drive for starting and during the gear change intervals and a lock-up clutch for normal driving in combination with a planetary gear unit having six forward ratios and reverse. This transmission may be manually controlled to provide manual selection of each ratio or to provide manual selection of certain ranges in conjunction with automatic controls to select the proper ratio within each of the manual ranges.

The cross drive unit has a central input shaft located transversely of the vehicle which is connected at each end by a right hand and a left hand planetary gear unit providing direct drive and reduction drive and a brake for each output shaft which is connected to the driving wheels or tracks. A manual control lever for each unit may be positioned to provide direct drive or reduction drive or to disconnect the drive and apply the brake. For normal forward or reverse drive, the control levers for both units are simultaneously positioned to provide direct or reduction drive or to apply the brakes of both units as the vehicle service brakes and disconnect the drive. For steering, the control levers are differently positioned. When one lever is positioned to provide direct drive and the other positioned to provide reduction drive, geared steering is obtained and when one lever is positioned for direct or reduction drive and the other lever for braking, braked steering is obtained. These right and left hand units are controlled by a mechanical and hydraulic control system in which each manual lever operates a cam. Each cam, during an initial range of movement, operates a shift valve to hydraulically shift the transmission from the normal direct drive to reduction drive and, in a second range of movement, actuates a floating lever. The floating levers are connected at one end to operate the brakes and at the other end to operate the steering valve to disconnect the drive. During normal operation of one steering lever for steering when the vehicle throttle is in a part throttle position, the floating lever will first operate the steering valve to disengage both the direct and and reduction drive and then quickly apply the brake. During coasting, when the throttle is in the closed throttle position, movement of the steer valve is inhibited so that a substantial application of one brake for steering is effected before the steering valve is actuated to disconnect the drive. If both steering levers are applied, to employ the brakes as vehicle brakes, either under part throttle conditions, or at zero throttle, the brakes will be applied but the steer valve will not be moved and thus the drive in the cross drive unit will be maintained permitting normal stopping by downshifting of the multiratio transmission to its normal neutral converter drive condition. In the hydraulic control system, provision is made to supply cooling fluid to the disk type hydraulic brakes only during brake application and to the low ratio clutch only during the initial phase of clutch engagement.

An object of the invention is to provide a vehicle power plant having an engine unit, a multiratio transmission unit and a cross drive transmission unit, each located transversely of the vehicle.

Another object of the invention is to provide a multiratio transmission having a torque converter and multiratio gearing driving a cross shaft which is connected at each end to the output shafts by a multiratio gear unit.

Another object of the invention is to provide in a transmission a multiratio transmission unit connected to drive the cross shaft of a cross drive unit having at each side a multiratio gear unit and a brake and control mechanism for the gear unit and brakes to effect steering of the vehicle.

Another object of the invention is to provide in a cross drive transmission unit having an input shaft connected to right and left hand multiratio gear units to drive a right and left hand output shaft and a brake connected to each output shaft, a control mechanism therefor which during normal part to full throttle operation of the vehicle will first disconnect the drive to the output shaft and then apply the brake and during closed throttle or coasting condition will apply the brake and thereafter disconnect the drive to the output shaft.

Another object of the invention is to provide in a transmission unit having an input shaft connected by a planetary gear unit to a right hand output shaft and a planetary gear unit connecting the input shaft to a left hand output shaft and a right and a left hand vehicle brake connected to the respective output shafts, a control mechanism for mechanically actuating the brakes and hydraulically actuating the planetary gear unit to provide during an initial control range a reduction from direct drive to reduction drive in a planetary unit and thereafter apply the brake and disconnect the drive.

These and other objects of the invention will be more apparent from the following complete description and drawings of the preferred embodiments of the invention.

Fig. 1 shows the power plant and transmission gearing layout schematically.

Fig. 2 shows the transmission combination of Figs. 3a, 3b, and 3c.

Figs. 3a, 3b and 3c, when arranged in accordance with the diagram in Fig. 2, shows the hydraulic controls for this transmission.

Fig. 4 is an isometric view showing the control mechanism.

Fig. 5 is an elevation view of the control mechanism.

Fig. 6 shows a modified shift valve.

The general arrangement of the power plant particularly adapted for tracked or drive wheel steered vehicles providing an engine 10 and the drive mechanism including the main transmission unit 11 and the cross drive transmission unit 12 is illustrated schematically in Fig. 1. Each of these units extends transversely across the vehicle and may be stacked horizontally or vertically and arranged with respect to the center line of the vehicle to equally distribute the weight of the vehicle on the traction devices such as tracks or wheels driven by this power plant. The engine 10 has an output shaft 14 driving the engine output gear 15 which is suitably connected by spur gears 16 to the transmission input gear 17 mounted on the input shaft 18 of the six ratio transmission unit 11. In order to drive the fluid torque converter 19, the transmission input shaft 18 connected to the converter housing 21 which carries the converter pump blades P. The converter has a bladed turbine member T which is connected by the hub 23 to the converter output shaft 24. The converter has a stator S which may consist of first and second bladed stator members connected through one-way clutches to the ground sleeve 26.

The lock-up clutch 22 directly connects the input shaft 18 to the converter output shaft 24 to provide a direct drive when the torque multiplication provided by the converter is not needed.

The converter output shaft 24 is connected to the two ratio splitter gear unit 28 and drives the carrier 29 on which are rotatably mounted a plurality of planetary pinions 31. The pinions 31 mesh with a sun gear 33 which is connected by a hub 34 to a rotating clutch 36 and a reaction brake 37, also called a ground brake. When the rotating clutch 36 is hydraulically actuated the sun gear 33 is connected to the planetary carrier 29 for direct drive. When the reaction brake 37 is hydraulically actuated the sun gear 33 is connected to the transmission housing or grounded to hold the sun gear stationary for overdrive. The ring gear 41 also meshes with planetary pinions 31 and is connected by a hub 42 to the splitter gear unit output shaft 43. The clutch 36 and brake 37, or ratio establishing devices are alternatively applied by a suitable control system to provide either direct drive or overdrive in the splitter gear unit 28.

The shaft 43 drives the three ratio and reverse gear unit 44 and has fixed thereon a first sun gear 46 and a second sun gear 47. The first sun gear 46 meshes with the planetary pinions 49 which are mounted on the carrier 51 secured to the output shaft 52. A ring gear 54 which is formed as a part of the carrier and gear assembly 56 meshes with the pinions 49. A hydraulically actuated reaction brake 58 is actuated to hold the ring gear 54 stationary to provide low ratio. The assembly 56 also has a carrier portion 61 rotatably supporting planetary pinions 62 which mesh with the second sun gear 47 and the ring gear 63. When the reaction brake 65 is hydraulically engaged to hold the ring gear 63 stationary the transmission is in intermediate ratio. The hydraulically actuated clutch 67 connects the carrier 61 in a hub 69 connecting to the shaft 43 to lock up this three ratio planetary gearing to provide direct drive. The reverse planetary pinions 72 are mounted on the carrier 73 secured to the output shaft 52 and mesh with a sun gear 74 formed as a part of the carrier gear assembly 56 and with the ring gear 76. When the ring gear 76 is held stationary by the hydraulically actuated reaction brake 77, the planetary unit provides reverse drive. The clutch and reaction brakes or ratio establishing devices of the three ratio and reverse unit 44 are individually applied to provide each drive. The splitter unit 28 and three ratio unit 44 provide in combination six ratios. Splitter direct drive in combination with low, intermediate, and direct drive provides first, third and fifth ratios and splitter overdrive in combination with low, intermediate and direct drive provides second, fourth and sixth ratios. In reverse two ratios may be provided but if an output shaft governor responsive only to forward rotation controls the upshift of the splitter unit, no upshift will occur, and only one ratio will be provided in reverse.

The main transmission unit 11 is connected by output shaft 52, output gear 81 and transfer gear 83 to the cross shaft 84 of the cross drive transmission unit 12. Cross shaft 84 is connected at each side of the vehicle by a hub 86 to an input ring gear 87 which meshes with planetary pinions 89 mounted on the carrier 91 driving the drive output shaft 92 connected to the traction devices such as tracks or wheels on each side of the vehicle. A sun gear 93 meshes with the planetary pinions 89 and is connected by a sleeve shaft 94 to the clutch element 95. Clutch element 95 may be connected either by the rotary high clutch 97 to the hub 98 secured to the output shaft 92 to lock up the plantetary unit to provide direct drive or by the reaction brake 101 to hold the sun gear 93 stationary to provide a reduction drive. The clutch 97 and brake 101 are hydraulically actuated as shown in detail in Fig. 3c described below. A mechanically actuated brake 103 of the multiple plate type located between the frame and the planetary carrier 91 secured to the drive shaft 92 provides vehicle service and steering braking. The arrows in Fig. 1 indicate the direction of rotation of the shafts for forward drive considering Fig. 1 a view of the power plant from the rear or top of the vehicle.

Controls

This transmission employs a semi-automatic control system which permits the operator of the vehicle to select a gear ratio or range of gear ratios for the six speed transmission unit by means of a single ratio control lever and to selectively control vehicle steering and braking by controlling the drive ratio and the brakes in the cross drive unit 12 by means of the right and left hand steer levers 291 and 292. The six speed transmission unit 11 may employ a suitable transmission control system (not shown) constructed in accordance with the disclosure in the assignee's copending application S. N. 509,298, filed May 18, 1955, and S.N. 554,866 and S.N. 554,720, both filed December 22, 1955, in the names of Christenson et al., entitled, "Transmission." The control system of the above application S.N. 509,298 provides manual selection of six forward ratios and reverse without automatic speed responsive control. Application S.N. 554,720 would provide a control system in which the operator may select three ranges, each providing two gear ratios. Application S.N. 554,866 provides a more complex control system in which a manual selector may be operated to provide a first and second range, each providing two ratios, and a third range providing four ratios, two of these being the same as in one of the other ranges.

The regulated main line pressure of these hydraulic control systems may be used to supply the main line 130 of the cross drive unit 12 control system, illustrated in Fig. 3a. The fluid supply may consist essentially of a transmission sump 125 connected by line 126 to an input driven pump 127 which supplies the main line 130 with fluid at a pressure controlled by the regulator valve 128. The main line branch 131 may be employed to supply fluid under pressure to the main transmission unit 11.

The main line 130 is connected by the throttle valve 132 to supply fluid to the throttle line 133 when the throttle is in substantially a closed position. The throttle lever is connected by a suitable linkage to the throttle cam 134 which engages the valve element 135 having lands $a$ and $b$ located in the bore 136 to hold the valve element when the throttle is in the closed throttle position, in the position shown connecting the main line 130 to the throttle line 133. The spring 137 biases valve element 135 into engagement with cam 134. When the throttle is depressed the cam 134 moves the valve element 135 into the bore compressing the spring 137 and blocks the main line 130 and exhausts the throttle line 133 between lands $a$ and $b$ to the exhaust port 138. The spring chamber portion of bore 136 is exhausted at vent 139.

The steer valve 140 controls the supply of fluid to the right and left shift valves 165 and 166 respectively in accordance with the position of the steering control levers. When fluid is supplied by the steer valve 140, the right and left shift valves supply fluid to right and left direct drive clutches 97 or the reduction drive brakes 101 to provide a drive through each planetary gear in the cross drive transmission 12 but when fluid is not supplied by the steer valve 140 to one shift valve, the corresponding clutch 97 and brake 101 are disengaged and the drive is disconnected. The steer valve 140 has a valve element 141 having lands $a$, $b$ and $c$ of equal diameter located in a bore 142. Lands $a$ and $c$ project from opposite ends of the bore and are engaged respectively by the right hand actuating lever 143 and the left hand actuating lever 144. In the central or straight drive position shown, the exhaust 145 is blocked by the central land $b$ and the main line 130 and its branch 147 is connected between the lands *a* and *b* to the right hand supply line 148 and between lands *b* and *c* to the left hand supply line 149. When the left actuating lever 144 is moved, it will move land *c* of valve element 141 into the bore blocking the connection between main line 130 and the space between lands *b* and *c* and connecting left hand supply line 149 to exhaust 145. During this movement of the valve, fluid is continuously supplied to the right line 148 between the lands *a* and *b* from the main line 130 and branch 147. Conversely, movement of the right hand actuator lever 143 moves valve element 141 to cut off the supply of fluid to the right hand shift valve line 148 and to exhaust this line 148 without affecting the supply of fluid to the left hand supply line 149. The valve element 141 has shoulders 151 and 152 at the ends to limit movement of the valve.

When the manual steering control lever 291 and 292 (Fig. 4) are moved in braking position they exert a force on the actuator levers 143 and 144. These levers are biased to the central position shown in which they tend to hold the valve element 141 in the central position by the inhibitor 155. The inhibitor has opposed plungers 156 and 157 located in bore 158 which are resiliently urged by spring 159 outwardly against the stops 161 and 162 respectively.

At substantially closed throttle the throttle valve 132 supplies fluid via line 133 to the bore 158 to provide additional force holding the plugs 156 and 157 against the stops and thus hold the actuating levers 143 and 144 in the central position. Thus movement of the steering controls is inhibited at closed throttle unless the operator exerts a substantially larger force to move the steering control levers so that the vehicle brakes 103 are applied before the drive is disconnected as explained below. When the throttle control is in an advanced position the bore 158 is exhausted and spring 159 only offers a moderate resistance to steering permitting disengagement of the drive before application of the vehicle brakes 103 as explained below.

The right hand shift valve line 148 and left hand shift valve line 149 are connected to supply the right hand shift valve 165 and the left hand shift valve 166 respectively. The right shift valve 165 is actuated by the right shift valve cam 168 controlled by the right hand steering lever 291 and the left hand valve 166 is actuated by the left hand cam 169 controlled by the left hand steering lever 292 as explained below.

Since the shift valves 165 and 166 are identical, like reference numerals are applied to the parts. Each of the valves 165 and 166 has a stepped bore 171 having a small central portion 172 and a large portion 173 at the closed end and a large portion 174 at the open end. The valve element 176 is slidably mounted in the bore with land *a* adjacent one end fitting the small bore 172 and a large land *b* at the other end fitting the large diameter or portion 173 at the closed end of the bore. The valve element 176 has between lands *a* and *b* a slotted guide 178 which slidably supports the valve element in the small bore portion 172 but permits flow of fluid through slots therein. The valve element 176 is urged to the right to the high ratio position by a spring 179 which seats in a bore 181 in the end of land *b* and on an abutment 182 fixed in the end of the large bore portion 173. The abutment 182 closes the bore 173 but has a tube portion venting bore 173 and providing a stop to limit movement of valve element 176. The other end of the valve element 176 is engaged by a plug 184 slidably mounted in the large bore 174. The spring 185 holds the plug 184 in contact with valve element 176 and resiliently urges it to the left or low ratio position. The spring force supplied by spring 185 is varied by the right or left shift valve cams 168 and 169 which contact the plug 186 engaging the other end of spring 185.

With the valve 176 in the normal or high position shown in Fig. 3*b*, further movement to the right under the influence of spring 179 is limited by the engagement of the land *b* with the shoulder 187. When the valve is in high position the exhaust port 191 in large bore portion 173 is blocked by land *b*, the inlet port 192 is located in the small bore portion 172 with a portion between lands *a* and *b* and a portion blocked by land *a*, the high clutch port 193 is located in the large bore 173 between lands *a* and *b* adjacent land *b*, the low clutch port 194 is located in the large bore portion 174 adjacent to the small bore portion 172 and the low cooling port 196 adjacent the face of plug 184. The plug 184 has an annular groove 195 adjacent the face to restrict flow to the port 196 or to restrict flow and then close port 196. The portion of bore 174 between plugs 184 and 186 is vented by exhaust 197. In the high position shown, fluid at main line pressure enters at the inlet port 192 and flows between the lands *a* and *b* through the slotted guide 178 to the high ratio port 193 and the low port 194 is connected to exhaust through the cooling port 196. Movement of the shift valve cams 168 or 169 moves the plug 186 to increase the force of spring 185 acting on the plug 184 and valve element 176. This force together with the force of fluid under pressure acting on the unbalanced area between lands *a* and *b* moves the valve element 176 to the left compressing the spring 179. When the land *a*, which has a width equal to the width of the inlet port 192, closes the inlet port 192, the plug 184 just moves over port 196 so that a restricted flow is permitted through groove 195 to cooling port 196, the high ratio port 193 is connected to exhaust 191 by the small recess 177 on land *b*. At this point the valve 176 starts to regulate the pressure in the high ratio clutch connected to the high ratio port 193. The high clutch pressure which in the high position of the valve 176 was full line pressure is reduced as additional movement of cam 168 or 169 moves the spring abutment plug 186 to compress the spring 185 to apply additional force to the valve 176 to replace the fluid force on the unbalanced lands 176*a* and *b* until the high clutch pressure is reduced to zero. Then further movement of the cam moves the land *a* of the valve 176 past the port 192 to connect this port between the land *a* and the plug 184 to the low port 194 and through the restricted passages provided by groove 195 to the cooling fluid port 196 to engage the low ratio brake 101 and supply the low ratio plates with cooling fluid. The fluid connected to the low brake through the low port 194 acts on the unbalanced area of land 176*a* and plug 184 to oppose movement of the valve assembly 176 and 184 so that the low brake pressure is regulated to increase with movement of the cams 168 and 169 as they increase the force applied to the valve by spring 185 to gradually increase the pressure to full line pressure. During the initial 15° of movement of actuator cams 168 or 169, the valve element 176 is moved from the initial high ratio position to the low ratio position. Further movement does not move the valve element 176 but merely applies the brakes as will appear below. Further movement of the valve 176 and the plug 184 may be employed to completely block cooling port 196. If this is desired the spring and plugs 184 and 186 are proportioned so that the plug 186 contacts the plug 184 when or shortly after the low clutch port 194 is supplied with full line pressure to directly move plug 184 to close cooling port 196.

The steer valve 140 is connected by the right hand supply line 148 to the inlet port 192 of the right shift valve 165 which may supply fluid through high port 193 and right high clutch line 201 to the right high clutch 97, through a low port 194 and right low brake line 202 to the right low brake 101, and through cooling port 196 and right cooling line 203 to cool the right low brake 101. Similarly, the steer valve is connected by the left hand supply line 149 to inlet port 192 to the left shift valve 166 which may supply fluid through high port 193 and left high clutch line 206 to the left high clutch 97, through low port 194 and left low brake line 207 to the left low brake 101 and through cooling port 196 and left cooling line 208 to cool the left low brake 101.

The right and left hand brake cooling lines 211 and 212 respectively are supplied by an identical fluid supply system which has a transmission output or cross shaft driven pumps 214 and 215, respectively, shown in Fig. 3b. The inlet of pump 214 is connected by line 216 to the outlet chamber 217 of the right hand check valve 218. The outlet chamber is also connected by the right hand air line 219 to the right air valve 220, shown in Fig. 3a. The inlet chamber 222 of valve 218 is connected to a source of fluid by the line 223 which is connected to the sump 125. Flow from the inlet chamber 222 to the outlet chamber 217 of valve 218 is normally prevented by the valve element 226 which is held in closed position by the spring 227 engaging the valve element and the valve body. The valve element and spring are slidably mounted in a guide 228 fixed in the valve body. The right air line 219 is controlled by the right air valve 220 having a seat 231 which is engaged by the valve element 232 under the influence of spring 234 to close the valve and prevent air entering line 219. When the brakes are disengaged the steering lever 291 moves the cam 235 to engage the lever 236 which in turn moves element 232 to open position admitting air to the line 219. When, or just before, the brakes are applied, the cam 235 moves back away from lever 236 to permit spring 234 to close the valve blocking the flow of air to line 219. Then the pump 214 can no longer draw air through air valve 220, line 219 and check valve chamber 217 but will draw oil from sump 125 through line 223 and check valve 218 to supply oil to cool the right brake 103 through line 211.

The left hand brake cooling pump 215 has an intake line 238 connected to the left hand check valve 239 which since the parts are identical to right check valve 218 are correspondingly numbered. The left hand check valve 239 is correspondingly connected, the outlet chamber 217 being connected to the inlet 238 for the left hand pump 215 and to the left air line 241 which is connected to the left air valve 242. The inlet chamber 222 of left valve 239 is connected by line 223 to a source of fluid such as sump 125. The left hand air valve 242 is the same as the right hand air valve 220 and thus the parts are correspondingly numbered. The left hand air valve 242 is actuated by a cam 244 connected to the left hand steering control mechanism and operates in the same manner as the right hand air valve 220 as explained above.

The cross drive transmission unit 12 illustrated diagrammatically in Fig. 1 is shown with structural detail in Fig. 3c. The input gear 83 is splined to shaft 84 which is supported by the bearings 245 and 246 in the housing 247. At each side of the vehicle, the end of the shaft 84 is splined to a hub 86 which carries the input ring gear 87. The ring gear 87 meshes with planetary pinions 89 mounted on the carrier 91 which is connected with the output or wheel shaft 92. The carrier 91 is connected to a drum 249 which is rotatably supported by a bearing 251 at the other side of the gear set. Bearing 251 thus supports the inboard end of the output shaft 92 and bearing 250 supports the outboard end. The multi-disk vehicle brake 103 has one set of plates splined to the drum 249 and the other set externally splined to the housing 247. A housing portion provides a fixed abutment at one end of the plates and a rotatable brake actuating ring 252 is located at the other end of the clutch plates adjacent a fixed cam ring 253. Cam balls 254 are located in complementary inclined cam grooves in the fixed ring 253 and the rotatable ring 252 so that when the ring 252 is rotated, it moves axially to engage the brake 103. Since the cam ring 252 is engaged by a brake disk rotating with the output shaft 92, the brake is self energizing. The brake is returned to the off position illustrated by the plurality of return plungers 255 actuated by springs 256.

The sun gear 93 of the planetary gear set is connected to the clutch element or drum 95 by a stepped sleeve shaft 94 rotatably supported by bearings 257 on shaft 92. One set of plates of the high ratio clutch 97 is splined to the internal surface drum 95 while the other set of plates is splined to the external surface of hub 98 fixed on output shaft 92. The plates of clutch 97 are engaged between a fixed abutment on shaft 94 and an annular piston 261 located in a cylinder 262 formed in the disk 263 rotatable in bearing 264 with drum 95. The shaft 94, drum 95 and disk 263 form an assembly which is supported at one end on shaft 92 by bearing 257 or by contact of sun gear 93 with pinions 89 and at the other end by bearing 264 on housing 247. The right hand cylinder 262 is supplied with fluid by the right hand high clutch line 201 to engage the right high ratio clutch 97 while the left hand high ratio clutch cylinder 262 is supplied by line 206 to engage left hand high ratio clutch 97.

The low ratio reaction brake 101 consists of a plurality of plates alternately splined to the drum 95 and to internal splines on the housing 247. Annular piston 271 is located in the cylinder 272 in the housing and acts against one end of brake plates 101 while the other engages an abutment portion of the housing unit to apply the clutch.

The cross drive gearing and clutches are supplied with lubrication at each side of the unit by a line 281 passing through a partition 282 of the housing 247 to a transfer bearing 283 in the shaft 94. The transfer bearing 283 is connected by a transverse passage 284 to supply lubrication to both the planetary gearing and the clutch assembly.

The mechanical or linkage portion of the control system, illustrated in Fig. 4, controls the brakes directly and the valves of the hydraulic control system, illustrated in Fig. 3, to effect steering. The right steering lever 291 for steering the vehicle to the right and the left steering lever 292 for steering the vehicle to the left are preferably located at the operator's station on the vehicle. The levers 291 and 292 are pivoted to the vehicle frame and respectively connected by rods 293 and 294 to cranks 295 and 296 which are fixed on and rotate the concentric right and left hand control shafts 298 and 299 respectively. The entire control linkage for right and left hand steering is maintained in the brake off position by suitable retraction springs 301 and 302 which may be suitably connected to the cranks 295 and 296 and the vehicle frame. The shafts 298 and 299 are connected respectively to the right cam 304 which controls the right hand portion of the mechanism and to the left cam 305 which controls the left hand portion of the steering mechanism. The lever cam 235 for actuating the right air valve 220 is attached to the cam 304 and the lever cam 244 for actuating the left air valve 242 is attached to cam 305. The cams 235 and 244 move away from the lever 236 of the right and left air valves 220 and 242 respectively after the cams have moved from the high to the low ratio position and just prior to movement into the brake apply position so that fluid is supplied to cool the brakes 103 before initial application.

The cams 304 and 305 also operate the shift valves 165 and 166 respectively and have at their top surfaces a cam portion 306 and 307 which engages the rollers 308 and 309 on the levers 168 and 169 respectively. The cams in their first 15° of rotation from the high to the low ratio position pivot the levers about the pivots 311 and 312 on the cross drive unit frame 247 to move the shift valves 165 and 166 respectively from the high to the low ratio position. The cams 304 and 305 also have a second cam surface 314 and 315 which engage the rollers 316 and 317 mounted at a mid-portion of the right hand floating lever 318 and the left hand floating lever 319, respectively. The lower end of the levers 318 and 319 are connected by pin-type pivot to the brake levers 321 and 322 which are connected by adjustable universal connections 323 and 324 to the right and left actuating rings 252, respectively. Each of the adjustable connections 323 and 324 has a ball element adjustably mounted on a threaded portion of the levers 321 and 322 which fits into a socket on the actuating arm of the brake rings 252. The levers 321 and 322 each carry a key member 325 having limited axial sliding movement but held against rotation. The keys 325 are resiliently held in a keyway in the ball portion of connections 323 and 324. The floating levers 318 and 319 are held in operative position due to the lateral rigidity in their pivot connection to brake levers 321 and 322. Though the brake cams 252 have some axial movement and thus rotate the levers 318 and 319 about their longitudinal axis, this movement is insufficient to interfere with the operation of the linkage. The levers 318 and 319 may be guided in the frame. Then the pivot between the floating levers and the brake levers must permit some lateral movement. The upper ends of the levers 318 and 319 are connected by universal pivots 326 and 327 to the short arm of the bell crank levers 143 and 144 respectively, which are pivoted to the housing by pin-type pivots 329 and 331 which position these levers in a plane for rotation. As explained above, levers 143 and 144 have a flat end portion at the end of the long arm to actuate the steer valve 140 and engage the inhibitor 155.

The shape of the cam 305 is best shown in Figure 5 which illustrates the left portion of the linkage in the high ratio position. In this embodiment, the cam surface 307 moves the roller 309 to move the valve 166 from the high ratio position to the low ratio position during the first 15° of movement. Thereafter, during further movement for brake application, the lever 169 does not move since the roller 309 engages the circular cam surface 333. The second cam surface 315 which engages the roller 317 to apply the brake and actuate the steer valve, has during substantially the first 15° of movement, a circular surface so that no movement of the lever 319 occurs. Thereafter during a first range of cam rotation, the cam rises rapidly to quickly take up slack in the brake linkage and then, during a second range, gradually for a full high mechanical advantage application of the brake. When the cam surface 315 engages roller 317 to move lever 319 one end acts to move brake lever 322 and the other end acts through lever 144 to apply a force to the steer valve 140 which will be moved to disconnect the drive when one of the cams 304 and 305 is actuated but not when both are actuated as explained below. A ball detent 336 may be placed in the cam to cooperate with a recess 337 in the housing to provide operator feel as the cam rotates past the low ratio range to the brake application range. Fig. 5 shows a coil type return spring 332 which may be used alternatively or cumulatively with return spring 302. The right cam 304 is the same and functions in the same manner.

The modified shift valve 341 shown in Fig. 6 provides a quick decrease in the high clutch pressure and a gradual increase in the low clutch pressure with some overlap in the timing of the cut-off of the high pressure and the application of the low pressure to provide a quick shift without disconnecting the drive. The valve 341 has a body 342 having a stepped bore 343 having at the open end a large diameter portion 344 a central small diameter portion 346 and a large diameter portion 347 at the other end providing a spring chamber. The spring chamber 347 is sealed by an abutment 348 for the spring 349 which engages the end of the valve element 351 having a land $a$ and $b$ of the same diameter slidable in small bore 346 and an intermediate space having a port 353 connected by a passage 354 to the free end of the valve land $a$ to provide communication between the space between lands and the spring chamber 347. In a normal high ratio position of the valve as shown land 351$a$ blocks the main line inlet port 356 located in the central bore portion 346. The low clutch port 357 is located in the small diameter bore portion 346 and connected by the space between the lands $a$ and $b$ to large bore 343.

The low clutch cooling port 358 is connected with the large diameter bore 344 at the shoulder between this bore and the small diameter bore 346 but since in this valve position, land $b$ is located in the large diameter bore portion 344, the port 358 is connected between the lands $a$ and $b$ and thus to the low clutch port 357 in order to provide an exhaust for the low clutch. The valve element 361 has lands $a$, $b$ and $c$ of equal diameter fitting the large bore portion 344. The actuator cam 168 which may have an adjusting screw engages the solid end of land 361$c$. The valve element 361 has a central bore 363 containing a full length spring 364 and a shorter bumper spring 366. In the normal or high ratio position of valves 351 and 361 the full length spring 364 engages both elements while the bumper spring 366 engages only valve element 351. The main line port 367 is located, when the valve element 361 is in the normal position to communicate with the space between lands $a$ and $b$ adjacent to land $a$. The high clutch port 368 which is slightly narrower than the land $b$ is positioned so that in the normal valve position this port though partially closed is in communication with the space between lands $a$ and $b$ adjacent to land $b$. The exhaust port 369 is positioned to communicate at all times with the space between lands $b$ and $c$. In the normal valve position shown the low clutch port 357 is connected to the low cooling port 358 which provides an exhaust and the main line port 367 is connected between lands 361$a$ and $b$ to the high clutch port 368 to engage the high ratio clutch. Movement of the steering control during the first range of movement, i.e. 15° moves cam 168 to the left which moves the valve 361 to increase the force exerted by the full length spring 364 to move valve 351 to the left against spring 349 to crack open main line port 356. The fluid enters the space between land 351$a$ and $b$ and supplies the low clutch port 357, low cooling port 358, and at the same time enters port 353 and passage 354 to the chamber 347 to provide a fluid pressure force causing movement of the valve 351 assisting spring 349. Thus pressure is applied to the low clutch port 357 at a low but increasing value on the initial movement of cam 168. While the low clutch pressure is at a very low value, further movement of cam 168 moves valve 361 until land $b$ first closes the connection between main line port 367 and the high clutch port 368 and thereafter connects this port to the exhaust 369 to cut high clutch pressure at this point. Then as the force applied to valve element 351 by spring 364 is increased, the pressure in the low clutch port 357 is further increased. When the bumper spring 366 is engaged and thereafter the pressure is increased at a high rate until movement of cam 168 ceases. Either just before or after full line pressure is supplied to the low clutch, land 351$b$ enters bore 346 and stops the supply of fluid to cooling port 358. When the brakes are disengaged and the steer control mechanism moved to shift from low ratio to high ratio the return movement of cam 168 provides similar pressure change wherein the pressure supplied to the low clutch port 357 is at first quickly reduced and then gradually reduced. Then the high clutch pressure is quickly applied to prevent disengagement of the drive during the shift.

Operation

The transmission 11 shown diagrammatically in Figure 1 provides six forward ratios and reverse, a torque converter 19 providing additional torque multiplication during starting and rapid acceleration and during each ratio change in the planetary gear units and a lock-up clutch 22. This transmission may be controlled by a hydraulic control system as shown in the above identified application, S.N. 554,720 to provide three ranges of automatic operation, namely, "Low," providing first and second ratios, "Intermediate" providing third and fourth ratios, and "High" providing fifth and sixth ratios, and "Reverse" providing one reverse ratio. In another form of control system as shown in the above identified application S.N. 554,866, another arrangement of controls is provided in which the "High" range of manual control not only has fifth and sixth ratio, but also fourth and fifth, to provide a range having complete automatic control for average driving conditions. Each of these transmission control systems may be up-shifted and down-shifted either automatically or manually and the torque converters provide a neutral condition at engine idling speeds which permit stopping while the gear transmission is engaged in a ratio. A control system providing full manual selection of each ratio is shown in the above identified application S.N. 509,298.

The main transmission 11 provides a multiratio drive for the cross-drive transmission unit 12 which normally provides a direct drive or high ratio connection to the ground wheels but may, under the influence of the steering controls, provide a reduction or low drive or disconnect the drive and brake the ground wheels individually for steering or simultaneously for vehicle service braking.

The operator of the vehicle controls the cross drive transmission unit 12 to provide forward ratio control, steering control, and brake control by means of the steering control levers such as the right hand steering control lever 291 and the left hand steering control lever 292. The levers 291 and 292 are connected by links 293 and 294, cranks 295 and 296 and concentric shafts 298 and 299 to the cams 304 and 305, respectively. These controls are retained in the high ratio position by springs 301 and 302 respectively. When the control levers 291 and 292 are in the high ratio position shown the control valve of the hydraulic control system illustrated in Figures 3a, b, and c are in the positions shown.

When the engine is started, the input driven pump 127 supplies fluid at a pressure regulated by the regulator valve 128 to the main line 130. With the steering valve 140 in the central position illustrated, main line 130 is connected to the right hand ratio valve supply line 148 and the left hand ratio supply line 149. These supply lines 148 and 149 are connected between lands 176a and b of the right hand shift valve 165 and the left hand shift valve 166 respectively to the high ratio line 201 and 206 respectively. The lines 201 and 206 are connected respectively to the right hand and left hand high ratio cylinders 262 to actuate the piston 261 and engage the clutches 97 which connect the sun gears 93 with their respective wheel shafts 92 to provide a direct drive through the planetary gear unit. At this time the right and left hand low ratio clutches 101 are disengaged by suitable retraction springs since the right hand clutch line 202 and the left hand low clutch line 207 are exhausted between land a of valve 176 and the plug 184 through the respective right hand valve 165 to the right hand cooling line 203 and through the left hand valve 166 to the left hand cooling line 207. Since at this time, the lever cams 235 and 244 hold the respective right hand air valve 220 and left hand air valve 242 open, air is supplied via line 219 and 241 respectively to the right hand check valve 218 and the left hand check valve 239 so that pumps 214 and 215 merely circulate or supply air to the right hand 211 and left hand 212 brake cooling lines. Thus, when the brakes are disengaged, there is no fluid pumping loss as due to a continued supply of cooling oil being delivered to the brakes.

The gear units in the cross drive transmission may be shifted from the high ratio to the low ratio simultaneously to provide a reduced forward driving gear ratio or they may be selectively shifted to provide a positive geared steer drive, providing a constant turning radius. The initial movement of levers 291 and 292 to rotate the cams 304 and 305 respectively through the first range, i.e. 15° of movement will rotate the levers 169 and 168 respectively to actuate the valves 166 and 165 and thus shift both cross drive units from direct drive to low ratio. In both the right hand and left hand valves 165 and 166 movement of the cams 168 and 169 will move the valve elements 176 to first exhaust the right and left hand high clutch lines 201 and 206 to exhaust 191 to quickly reduce the high clutch pressure and then momentarily block the inlet supply lines 148 and 149 and then connect these lines between the land 176a and the plug 184 to the right hand and left hand low clutch brake lines 202 and 207 to quickly supply full line pressure to the clutches. At this time main lines 149 and 148 will also be connected between the lands a and plugs 184 and the restricting groove 195 to supply a controlled volume of fluid to the cooling lines 203 and 208 for the low clutches. With further movement of the valves 165 and 166 providing a time interval during which the low brakes would be substantially applied, the plugs 184 may cut off flow to the low cooling lines 203 and 207 to terminate the supply of cooling fluid to these brakes when they are substantially fully engaged. Since the valves 165 and 166 provide a short time interval between the quick reduction of the pressure supplied to the high clutch and quick increase of pressure supplied to the low brake, there is no overlapping engagement of these brakes during a shift. When the valve 341 shown in Fig. 6 is employed overlap is provided since the supply of low brake pressure at a low rate of increase in pressure is initiated before the high clutch pressure is reduced. The high brake pressure is then quickly reduced while the low brake pressure is at a low value and rising at a low rate. The low brake pressure continues to rise slowly to obtain a gently full engagement of the clutch and then rises at a rapid rate to full line pressure to prevent slippage.

During this period of movement of cams 304 and 305, the arms 235 and 245 move and permit the springs 234 to move the valves 220 and 242 respectively toward the closed position but do not permit complete closure.

Also, as best shown in Figure 5, the cams 304 and 305 during the first 15° of movement have a circular cam surface contacting the rollers 316 and 317 respectively so that no control movement of the brake rings 252 or the steer valve 140 is effected. At this point, a detent ball 336 engages a recess 337 in the housing to provide a resistance to movement of each cam to inform the operator that the cam has been rotated from the direct drive to the low ratio position and that further movement will apply the brakes. Considering the operation first, when both levers 291 and 292 are simultaneously moved to apply the brakes 103 for vehicle service braking, the cams 304 and 305 rotate beyond the detent point and the lift portions on the cams engage the rollers 316 and 317 to move the center portion of the levers 318 and 319 respectively. This lift portion has a first high rate lift part to take up slack and gradual or low rate lift part to provide higher mechanical advantage to apply the brakes. Since the levers 143 and 14 are acting on opposite ends of the valve element 141 of the steer valve 140, these levers will not rotate about their pivots 329 and 331 respectively. Thus the universal pivots 326 and 327 between levers 143 and 144 and the floating levers 318 and 319 respectively will be fixed and the floating levers will rotate about these pivots when moved by the cams 304 and 305 to exert a force through the brake levers 321 and 322 to rotate the cams 252 to apply the brakes equally. It will be noted that when both brake levers are substantially equally applied, drive is maintained in low ratio through the cross drive transmission units and the brakes are applied in accordance with conventional service brake practice. When the brakes are equally applied the force exerted by floating levers 318 and 319 on actuating levers 143 and 144 will be the same. Since levers 143 and 144 act on opposite ends of valve 140 the valve will be held in the central position supplying fluid to both shift valves 165 and 166 to engage both the low ratio clutches. This type of operation is assured, since when the brakes are equally applied as service brakes, the throttle is in the closed throttle position. Then fluid will be supplied by the main line 130 through the throttle valve 132 and line 133 to the inhibitor 154, to actuate the plungers 156 and 157 to provide a force in addition to the normal spring force tending to stabilize the levers 143 and 144 in the neutral position and correct for any unbalance in the brake forces and thus insure that the steer valve element 141 will be maintained by the levers 143 and 144 in the neutral position. In bringing a vehicle to a stop by applying brakes in this manner, the drive is thus shifted from high ratio and maintained in low ratio through the cross drive transmission units as both brakes are applied but the automatic controls for the main transmission unit 11 will successively further reduce the speed ratio and disconnect the drive to provide the conventional downshifting and neutral drive condition of an automatic torque converter type transmission.

In order to effect sharper steering of the vehicle one of the levers, for example the right hand lever 291, is actuated to rotate the cam 304 beyond the first 15° of movement to apply the brake and disengage the drive. This movement of the cam 304 will engage the roller 316 and move the center of lever 318 to the right as viewed in Figure 4. Since movement of the lever 143, under normal steering conditions during part throttle operation of the vehicle, will be resisted by the spring 159 of the inhibitor 155 and, the universal pivot 326 on lever 143 will remain fixed during the initial movement of the floating lever 318. Thus, when the cam 304 rotates the floating lever will initially rotate about the fixed pivot 326 at its upper end and will swing to the right away from the shaft 299 and, acting through brake lever 321, rotate the right hand brake cam 252 to initiate application of the right hand brake 103. When the brake begins to act providing a low braking effort, the resistance offered to further rotation of the right hand brake cam 252, acting through lever 321, will tend to hold the lower end of lever 318 fixed. Thereafter, further rotation of the cam 304 for additional brake application will tend to move the rotating lever 318 about the pivot with the brake lever 321 and acting through the universal joint 326 connection to the bell crank lever rotate the lever 143 about the pivot 329 to overcome the resistance offered by the spring 159 of the inhibitor 155 and actuate the steer valve 140 to cut off the supply of fluid from the main line 130 via branch 147 to the right hand shift valve 165. This will prevent the supply of fluid to either the right low and high ratio brakes in the cross drive transmission unit and disconnect the drive to the right hand driven wheel shaft 92. It should be noted that this inward movement of valve element 141 is limited by a shoulder 152 at the end so that the valve cannot move sufficiently to interfere with the supply of fluid to the left hand drive clutches 197 when the right hand clutches are disconnected or to move the right brake linkage sufficiently to apply the right brake.

When the vehicle is operating at closed throttle and particularly when coasting down hill, it is necessary, during steering operation, that the brake be substantially fully applied before the drive is disconnected in order to prevent coasting or free-wheeling of one wheel. In down hill steering this coasting would result in the vehicle turning in the direction opposite to that which would occur under normal driving conditions. In order to make certain that, in down-hill coasting condition, the vehicle steers properly, the control system automatically insures that the brakes are initially applied to a higher degree under zero throttle conditions before the drive is disconnected. This function is provided by the throttle valve 132 which during zero throttle operation is positioned as shown in Figure 3a by the cam 134 and supplies main line pressure to the throttle line 133. The throttle line supplies fluid to the bore 158 between the plungers 156 of the inhibitor 155. The inhibitor 155 thus provides a substantially increased resistance to movement of levers 143 and 144. Thus when one of the steering levers, for example, 292, is moved to apply the brake and the cam 305 rotates through brake applying arc, the floating lever 319 is rotated about the ball joint 327 as a fixed pivot since the bell crank 144 will not move due to increased resistance of the inhibitor 155. Since the lever 319 is rotating about the pivot 327, all movement is at first transmitted from the other end of lever 319 to the brake lever 322 to apply the left hand brake apply ring 252. Only after a substantially full application of the brake will the resistance to movement of the cam ring 252 be sufficient to hold the lever 322 so that the floating lever 319 will rotate about its pivot thereto and act through the joint 327 to rotate the bell crank lever 144 against the resistance of the inhibitor device 155 to disconnect the drive to the left hand clutches. Thus, under coasting conditions at zero throttle, this control arrangement provides for a substantial brake application before the drive is disconnected thus, prevents freewheeling.

Just before or when the brake is applied by the rotation of cams 304, 305, the cams acting through their respective levers 235 or 245, permit the air valves 220 or 242 to close. When this occur, the supply of air to the inlet chamber 217 of check valves 218 or 239 is cut off and the suction of pump 214 or 215 will open its respective check valves 218 or 219 and draw oil from the sump via line 223 and supply oil via line 211 or 212 respectively to either the right hand or left hand brake 103. Thus when either one or both brakes are applied cooling oil is supplied to that brake.

The above described embodiments are illustrative of the inventions and it will be appreciated by those skilled in the art that further modifications may be made within the scope of the appending claims.

We claim:

1. In a drive mechanism for an engine having a power demand signal device providing engine idling in a first position and increased power output in a second position, an input member driven by the engine, a pair of output members, a multiratio gear unit connecting said input member to each of said output members, a brake operatively connected to each of said output members to retard it, control means operatively connected to said gear units and said brakes to selectively provide one or another ratio drive in one or both of said gear units or to disconnect the drive through one or both of said gear units and apply the brake associated with each disconnected gear unit, and control interconnecting means responsive to said power demand signal device to vary the time sequence of said control means in disconnecting the drive through one of said gear units and applying the brake associated with said disconnected gear unit.

2. In a drive mechanism for an engine having a power demand signal device having a first position for engine idling and advanced positions for increasing engine power, an input member, an output member, a multiratio gear unit connecting said input member to said output member and having ratio engaging means to engage a first or a second ratio, a brake operatively connected to said output member to retard said output member and having a brake operator, inhibitor means controlled by said power demand signal device providing a movable stop having a high resistance to movement when said power demand signal device is in said first position and a low resistance to movement when said power demand signal device is in an advanced position, control means operatively connected to said ratio engaging means and said brake operator to selectively provide said first ratio drive, said second ratio drive, and to disconnect the drive through said gear unit and apply said brake.

3. In a drive mechanism for an engine having a fuel feed device having a first position for engine idling and advanced positions for increasing engine power, an input member, an output member, a drive mechanism connecting said input member to said output member and having means to engage said drive, a brake operatively connected to said output member to retard said output member and having a brake operator, inhibitor means controlled by said fuel feed device providing a movable stop having a high resistance to movement when said fuel feed device is in said first position and a low resistance to movement when said fuel feed device is in an advanced position, and brake control means regulated by said inhibitor means to disconnect said drive mechanism and apply said brake.

4. In a drive mechanism for an engine having a power demand signal device having a first position for engine idling and advanced positions for increasing engine power, an input member, an output member, a drive mechanism connecting said input member to said output member and having means to engage said drive, a brake operatively connected to said output member to retard said output member and having a brake operator, control means controlling the engagement of said drive means, inhibitor means controlled by said power demand signal device providing a movable stop having a high resistance to movement when said power demand signal device is in said first position and a low resistance to movement when said power demand signal device is in an advanced position, brake control means to disconnect said drive mechanism and apply said brake including a floating lever connected at one end to said brake operator and at the other end to said valve means and said inhibitor means and a manual control engaging said floating lever between said ends.

5. In a drive mechanism for an engine having a power demand signal device having a first position for engine idling and advanced positions for increasing engine power, an input member, an output member, a multiratio gear unit connecting said input member to said output member and having fluid operated means to engage a first and a second ratio, a brake operatively connected to said output member to retard said output member and having a brake operator, a source of fluid under pressure, valve means controlling the supply of fluid to said fluid operated means, inhibitor means controlled by said power demand signal device providing a movable stop having a high resistance to movement when said power demand signal device is in said first position and a low resistance to movement when said power demand signal device is in an advanced position, control means operatively connected to said gear unit and said brake operator to selectively provide said first, said second ratio drive, and to disconnect the drive through said gear unit and apply said brake including a floating lever connected at one end to said brake operator and at the other end to said valve means and said inhibitor means and a manual control engaging said floating lever between said ends.

6. In a vehicle having driven elements at each side of the vehicle, an engine located transversely of the vehicle having an engine output member at one end, a multiratio transmission laterally spaced from said engine and located transversely of the vehicle having a transmission input member connected to said engine output member and a transmission output member, a cross drive unit laterally spaced from said transmission and located transversely of said vehicle having a cross drive input member connected to said transmission output member and a pair of cross drive output members connected to said driven elements, said cross drive unit having a pair of drive control means connecting said cross drive output member to said cross drive input member to provide a drive or to said frame to retard said cross drive output members, said engine, transmission and cross drive unit being located transversely of said vehicle to locate the center of the weight of the assembly centrally of said vehicle.

7. In a transmission, a housing having end walls and a partition dividing said housing into first and second chambers, an input shaft having a ring gear located in said first chamber, a sun gear, an output shaft extending from said first chamber through said partition having a carrier having pinions meshing with said sun and ring gears in said first chamber, a brake operatively engaging said carrier to retard said output shaft, a sleeve shaft connected to said sun gear rotatably supported on said output shaft and extending through said partition, a clutch element in said second chamber connected to said sleeve shaft, a lubrication passage in said partition extending to an outlet port at the inner edge, transfer means to transfer lubricant from said passage to a conduit in said sleeve shaft communicating with said first and second chambers to lubricate said gears and clutch means.

8. In a transmission, a housing having end walls and a partition dividing said housing into first and second chambers, an input shaft rotatably mounted in one end wall and having a ring gear located in said first chamber, a sun gear located in said first chamber, an output shaft extending from said first chamber through said partition, said second chamber and the other end wall having a carrier having pinions meshing with said sun and ring gears in said first chamber, a drum secured to said carrier located externally of said ring gear and having a portion rotatably supported directly on said one end wall, a brake operatively engaging said drum to retard said output shaft, a sleeve shaft connected to said sun gear rotatably supported on said output shaft and extending through said partition, a clutch element in said second chamber connected to said sleeve shaft, clutch means in said second chamber to connect said clutch element to said output shaft to provide direct drive and to connect said clutch element to said housing to provide a reduction drive, a lubrication passage in said partition extending to an outlet port at the inner edge, transfer means to transfer lubricant from said passage to a conduit in said sleeve shaft communicating with said first and second chambers to lubricate said gears and clutch means.

9. In a transmission, a housing having end walls and a partition dividing said housing into first and second chambers, an input shaft rotatably mounted in one end wall and having a ring gear located in said first chamber, a sun gear located in said first chamber, an output shaft extending from said first chamber through said partition, said second chamber and the other end wall having a carrier having pinions meshing with said sun and ring gears in said first chamber, a drum secured to said carrier located externally of said ring gear and having a portion rotatably supported directly on said one end wall, a brake operatively engaging said drum to retard said output shaft, a sleeve shaft connected to said sun gear rotatably supported on said output shaft and extending through said partition, a clutch element in said second chamber connected to said sleeve shaft and rotatably supported on said other end wall, clutch means in said second chamber to connect said clutch element to said output shaft to provide a direct drive and to connect said clutch element to said housing to provide a reduction drive, a lubrication passage in said partition extending to an outlet port at the inner edge, transfer means to transfer lubricant from said passage to a conduit in said sleeve shaft communicating with said first and second chambers to lubricate said gears and clutch means.

10. In a transmission, a housing having end walls and a partition dividing said housing into first and second chambers, a planetary gear unit located in said first chamber and having a sun gear element, a ring gear element and a carrier element having pinions meshing witth said sun and ring gear elements, an input shaft rotatably mounted in one end wall and being connected to one of said elements, an output shaft extending from said first chamber through said partition to said second chamber and being connected to another of said elements, a stepped sleeve shaft having one end thereof connected to a third of said elements and rotatably supported on said output shaft and extending through said partition, clutch means elements in said second chamber connected to the other end of said sleeve shaft, one end of said stepped sleeve shaft being located inside the elements in one chamber and the other end being located outside the elements in the other chamber, a lubrication passage in said partition extending to an outlet port at the inner edge, transfer means to transfer lubricant from said passage to a conduit in said sleeve shaft having a port on the external surface communicating with said one chamber and having a port on the internal surface communicating with another chamber to lubricate said gear and clutch elements.

11. In a transmission, a housing having end walls and a partition dividing said housing into first and second chambers, a planetary gear unit located in said first chamber and having a sun gear element, a ring gear element and a carrier element having pinions meshing with said sun and ring gear elements, an input shaft rotatably mounted in one end wall and being connected to one of said elements, an output shaft rotatably supported on said one end wall extending from said first chamber through said partition and said second chamber and the other end wall and being connected to another of said elements, said another of said elements being directly supported on said one end wall, a brake operatively engaging said another of said elements to retard said output shaft, a sleeve shaft connected to a third of said elements and rotatably supported on said output shaft and extending through said partition, clutch means in said second chamber connected to said sleeve shaft, a lubrication passage in said partition extending to an outlet port at the inner edge, transfer means to transfer lubricant from said passage to a conduit in said sleeve shaft communicating with said first and second chambers to lubricate said gears and clutch means.

12. In a transmission, a housing having end walls and a partition dividing said housing into first and second chambers, a planetary gear unit located in said first chamber and having a sun gear element, a ring gear element and a carrier element having pinions meshing with said sun and ring gear elements, an input shaft rotatably mounted in one end wall and being connected to one of said elements, an output shaft extending from said first chamber through said partition and said second chamber and the other end wall and being connected to another of said elements, a drum secured to another said element and having a portion rotatably supported directly on said one end wall, a brake operatively engaging said drum to retard said output shaft, a sleeve shaft connected to a third of said elements and rotatably supported on said output shaft and extending through said partition, a clutch element in said second chamber connected to said sleeve shaft, clutch means in said second chamber to connect said clutch element to said output shaft to provide direct drive and to connect said clutch element to said housing to provide a reduction drive, a lubrication passage in said partition extending to an outlet port at the inner edge, transfer means to transfer lubricant from said passage to a conduit in said sleeve shaft communicating with said first and second chambers to lubricate said gears and clutch means.

13. In a transmission, a housing, a steer valve having a neutral position and movable in either direction to side positions, a pair of shift control valves having first and second positions, and brake operators having on and off positions mounted on said housing, a pair of bell crank levers centrally pivoted on said housing and each having one arm operatively connected to said steer control valve to move said steer control valve from said neutral position to one of said side positions, a pair of floating levers each connected at one end to the other arm of one of said bell crank levers and at the other end to one of said brake operators, a pair of control cams each having means to operate one of said shift valves and one of said floating levers, and having a first position holding said shift valve in said first position, said steer valve in said neutral position and said brake operator in said off position, and being movable to a second position moving said shift valve to said second position and holding said steer valve and said brake operator in the same positions when said cams are moved independently or simultaneously and said cams being movable simultaneously to a third position holding said shift valve in said second position, said steer valve in said neutral position and moving said brake operators to said on positions and each cam being movable independently to said third position to hold the connected shift valve in said second position, the connected brake operator in the on position and to move the steer valve to a side position.

14. In a transmission, a housing, a steer valve having a neutral position and movable in either direction to side positions, a pair of shift control valves having first and second positions, air valves having open and closed positions and brake operators having on and off positions mounted on said housing, a pair of bell crank levers centrally pivoted on said housing and each having one arm operatively connected to said steer control valve to move said steer control valve from said neutral position to one of said side positions, a pair of floating levers each connected at one end to the other arm of one of said bell crank levers and at the other end to one of said brake operators, a pair of control cams each having means to operate one of said shift valves, one of said air valves and one of said floating levers, and having a first position holding said shift valve in said first position, said steer valve in said neutral position and said air valve in said open position, and said brake operator in said off position, and being movable to a second position moving only said shift valve to said second position and holding said steer valve and said air valve and said brake operator in the same positions when said cams are moved independently or simultaneously and said cams being movable simultaneously to a third position holding said shift valve in said second position, said steer valve in said neutral position and moving said air valves to said closed position and brake operators to said on positions and each cam being movable independently to said third position to hold the connected shift valve in said second position, the connected air valve in the closed position and the connected brake operator in the on position and to move the steer valve to a side position.

15. In a transmission, a housing, a steer control means having a neutral position and movable in either direction to side position, a pair of drive control means having first and second positions, and brake operators having on and off positions mounted on said housing, a pair of bell crank levers centrally pivoted on said housing and each having one arm operatively connected to said steer control means to move said steer control means from said neutral position to one of said side positions, a pair of floating levers each connected at one end to the other arm of one of said bell crank levers and at the other end of said brake operators, a pair of control cams each having means to operate one of said drive control means and one of said floating levers, and having a first position holding said drive control means in said first position, said steer control means in said neutral position and said brake operator in said off position, and being movable to a second position moving said drive control means to said second position and holding said steer means and said brake operator in the same positions when said cams are moved independently or simultaneously and said cams being movable simultaneously to a third position holding said drive control means in said second position, said steer means in said neutral position and moving said brake operators to said on positions and each cam being movable independently to said third position to hold the connected drive control means in said second position, the connected brake operator in the on position and to move the steer means to a side position.

16. In a drive mechanism for an engine having a power demand signal device having a first position for engine idling and advanced positions for increasing engine power, an input member, a first and second output member, a first multiratio gear unit connecting said input member to said first output member having first fluid operated means to engage a first or a second ratio, a second multi-ratio gear unit connecting said input member to said second output member having second fluid operated means to engage a first or a second ratio, a first brake operatively connected to said first output member to retard said first output member and having a first brake operator, a second brake operatively connected to said second output member to retard said second output member and having a second brake operaor, a source of fluid under pressure, first and second shift valves controlling the supply of fluid respectively to said first and second fluid operated means normally biased to a first position providing said first ratio and movable to a second position providing said second ratio, valve means controlling the supply of fluid to said first and second shift valves having a neutral position supplying both shift valves, a first position supplying only said second shift valve and a second position supplying only said first shift valve, inhibitor means controlled by said power demand signal device providing a movable stop having a high resistance to movement when said power demand signal device is in said first position and a low resistance to movement when said power demand signal device is in an advanced position, first and second floating lever means operatively connected at one point to said valve means to move said valve means from said neutral position to said first and second position respectively and to said inhibitor means to retard said movement of said first and second floating lever means and operatively connected at another point to said first and second brake operators respectively, and a first and second control means having a neutral position respectively engaging said first and second shift valves to hold them in said first position to provide said first ratio, a second position moving said respective shift valves to said second position to provide said second ratio and a third position when operated simultaneously to apply said respective brake operators and hold said valve means in said neutral position to provide said second ratio in both units and when operated individually to move the respective floating lever means and brake operator to apply the respective brake and to move the valve means to the respective position disengaging the respective drive unit.

17. In a drive mechanism for an engine having a power demand signal device having a first position for engine idling and advanced positions for increasing engine power, an input member, a first and second output member, a first multiratio gear unit connecting said input member to said first output member having first ratio operator means to engage a first or a second ratio, a second multiratio gear unit connecting said input member to said second output member having second ratio operator means to engage a first or a second ratio, a first brake operatively connected to said first output member to retard said first output member and having a first brake operator, a second brake operatively connected to said second output member to retard said second output member and having a second brake operator, first and second shift control means connected respectively to said first and second ratio operator means and normally biased to a first position providing said first ratio and movable to a second position providing said second ratio, over control means controlling said first and second shift control means having a neutral position permitting operation of both shift control means, a first position permitting operation of only said second shift control means and a second position permitting operation of said first shift control means, inhibitor means controlled by said power demand signal device providing a movable stop having a high resistance to movement when said power demand signal device is in said first position and a low resistance to movement when said power demand signal device is in an advanced position, first and second floating lever means operatively connected at one point to said over control means to move said over control means from said neutral position to said first and second positions respectively and to said inhibitor means to retard said movement of said first and second floating lever means and operatively connected at another point to said first and second brake operators respectively, and a first and second control means having a neutral position respectively engaging said first and second shift control means to hold them in said first position to provide said first ratio, a second position moving said respective shift control means to said second position to provide said second ratio and a third position when operated simultaneously to apply said respective brake operator and hold said over control means in said neutral position to provide said second ratio in both units and when operated individually to move the respective floating lever means and brake operator to apply the respective brake and to move the overcontrol means to the respective position disengaging the respective drive unit.

18. In a transmission, an input member, an output member, drive means connecting said input and output members having a first and second fluid operated means to establish a first and second drive, a source of fluid under pressure, a passage connected to cool said first fluid operated means, an exhaust, control valve means including a valve element having a first port connected with an unbalanced area for exerting a force on said valve element toward a first position and a second port connected with an unbalanced area for exerting a force on said valve element toward said second position and biased to a first position, operator means exerting a variable force on said valve element to move said valve element from said first to said second positions, said valve element in said first position connecting said first fluid operated means through said first port to said passage for exhausting said first fluid means and connecting said source through said second port to said second fluid operated means, and during movement to said second position connecting said second fluid operated means through said second port to exhaust requiring additional force from said operator means to continue movement of said valve element to said second position and in said second position connecting said second fluid operated means through said second port to exhaust and said source through said first port to said first fluid operated means and said passage requiring additional force of said operator means to continue movement of said valve element to a third position connecting said second fluid operated means to exhaust said source to said first fluid operated means and disconnecting said source from said passage.

19. In a transmission, an input member, an output member, drive means connecting said input and output members having first and second fluid operated means to establish first and second drives, a source of fluid under pressure, exhaust means, valve means movable between first and second positions and biased to a first position and including first control means to exert a force on said valve means toward said first position and second control means to exert a force on said valve means toward said second position, operator means exerting a variable force on said valve means to move said valve means from said first to said second positions, said valve means in said first position connecting said first fluid operated means to said exhaust means and connecting said source to said second control means and said second fluid operated means, and during movement to said second position connecting said second fluid operated means and said second control means to said exhaust means requiring additional force from said operator means to continue movement of said valve means to said second position and in said second position connecting said second fluid operated means and said second control means to said exhaust means and said source to said first control means and said first fluid operated means and said exhaust means requiring additional force from said operator means to continue movement of said valve means to a third position connecting said second fluid operated means to said exhaust means, said source to said first fluid operated means and said first control means, and disconnecting said source from said passage.

20. In a transmission, an input member, an output member, drive means connecting said input and output members having a first and second fluid operated means to establish a first and second drive, a source of fluid under pressure, a passage connected to cool said first fluid operated means, an exhaust, control valve means including a first valve element having an unbalanced area acted on by fluid to urge said first valve element to a second position and biased to a first position, and a second valve element contacting and movable with said first valve element between similar first and second positions and having a larger area than the adjacent end of said first valve element so that the fluid between said valve elements urges said second valve element to a first position, operator means exerting a variable force on said second valve element to move both said valve elements from said first to said second positions, said valve elements in said first position connecting said first fluid operated means between said valve elements to said passage for exhausting said first fluid operated means and connecting said source between said unbalanced areas of said first valve element to said second fluid operated means, and during movement to said second position connecting said second fluid operated means between said unbalanced areas to exhaust requiring additional force from said operator means to continue movement of said valve elements to said second position and in said second position connecting said second fluid operated means to exhaust and said source between said valve elements to said first fluid operated means and said passage requiring additional force from said operator means to continue movement of said valve elements to a third position connecting said second fluid operated means to exhaust, and said source to said first fluid operated means, and disconnecting said source from said passage.

21. In a transmission, an input member, an output member, drive means connecting said input and output members having first and second fluid operated means to establish first and second drives, a source of fluid under pressure, a passage connected to cool said first fluid operated means, a control valve means including a first valve element movable between first and second positions and having an unbalanced area acted on by fluid to urge said first valve element to a first position and biased to a first position, and a second valve element movable between first and second positions, and spring means between said valve elements urging said first valve element to said second position and said second valve element to said first position, operator means exerting a variable force on said second valve element and through said spring means on said first valve element to move both said valve elements from said first to said second positions, said valve elements in said first position connecting said first fluid operated means between said valve elements to said passage for exhausting said first fluid operated means and connecting said source to said second fluid operated means, and during movement to said second position connecting said second fluid operated means to exhaust, and connecting said source to said unbalanced area and to said first fluid operated means and said passage requiring additional movement of said operator means to continue movement of said first valve elements to a third position connecting said source to said first fluid means, exhausting said second fluid operated means, and closing said passage.

22. In a drive mechanism, an input member, right and left hand output members, right and left hand multiratio gear units each providing a low and high ratio drive and a neutral condition respectively connecting said input member to said right and left hand output members, a right and left hand brake operatively connected to said right and left hand output members and movable from a disengaged to an engaged position to retard said output members, right and left manual control means respectively connected to said right and left hand gear units and brakes to selectively control said right and left hand gear units and brakes to in a first position establish said high ratio drive and to hold said brakes in said disengaged position and being movable to a second position to establish said low ratio drive and hold said brakes in said disengaged position when moved independently or simultaneously and being movable simultaneously to a third position to establish said low ratio drive and to engage both of said brakes and being operable on independent movement to said third position to engage one brake and place the corresponding gear unit in neutral.

23. In a drive mechanism, an input member, right and left hand output members, right and left hand multiratio gear units each providing a low and high ratio drive and a neutral condition respectively connecting said input member to said right and left hand output members, shift control means having corresponding positions to establish said low and high ratio drives and neutral, a right and left hand brake operatively connected to said right and left hand output members and movable from a disengaged to an engaged position to retard said output members, right and left manual control means respectively connected to said shift control means for said right and left hand gear units and to said brakes to selectively control said right and left hand gear units and brakes to in a first position establish said high ratio drive and to hold said brakes in said disengaged position and being movable to a second position to establish said low ratio drive and hold said brakes in said disengaged position when moved independently or simultaneously and being movable simultaneously to a third position to establish said low ratio drives and to engage both of said brakes and being operable on independent movement to said third position to engage one brake and to move said shift control means to neutral to place the corresponding gear unit in neutral.

24. In a drive mechanism for an engine having a power demand signal device movable from a low position to a high position, an input member, an output member, a drive mechanism connecting said input member to said output member and having means to engage said drive, a brake operatively connected to said output to retard said output member and having a brake operator, control means operatively connected to said means to engage said drive and said brake operator to engage said drive and to engage said brake and disengage said drive, and means responsive to said power demand signal device to vary the degree of overlap between the operation of said drive mechanism and said brake.

25. In a transmission, a housing, a steer valve having a neutral position and movable in either direction to side positions, a pair of shift control valves having first and second positions, and brake operators having on and off positions mounted on said housing, a pair of levers each connected to said steer valve and to one of said brake operators, a pair of control actuators each operating one of said shift valves and one of said levers, and having a first position holding said shift valve in said first position, said steer valve in said neutral position and said brake operator in said off position, and being movable to a second position moving said shift valve to said second position and holding said steer valve and said brake operator in the same positions when said cams are moved independently or simultaneously and said cams being movable simultaneously to a third position holding said shift valve in said second position, said steer valve in said neutral position and moving said brake operators to said on positions and each cam being movable independently to said third position to hold the connected shift valve in said second position, the connected brake operator in the on position and to move the steer valve to a side position.

26. In a transmission, a housing, a steer valve having a neutral position and movable in either direction to side positions, a pair of shift control valves having first and second positions, and brake operators having on and off positions mounted on said housing, a pair of controls each connected to said steer valve and to one of said brake operators, a pair of control actuators each operating one of said shift valves and one of said controls, and having a first position holding said shift valve in said first position, said steer valve in said neutral position and said brake operator in said off position, and being movable to a second position moving said shift valve to said second position and holding said steer valve and said brake operator in the same positions when said cams are moved independently or simultaneously and said cams being movable simultaneously to a third position holding said shift valve in said second position, said steer valve in said neutral position and moving said brake operators to said on positions and each cam being movable independently to said third position to hold the connected shift valve in said second position, the connected brake operator in the on position and to move the steer valve to a side position.

27. In a transmission, a housing, a steer valve having a neutral position and movable in either direction to side positions, a pair of shift control valves having first and second positions, and brake operators having on and off positions mounted on said housing, a pair of levers pivoted by a pivot on said housing and each operatively connected at a point spaced from said pivot to said steer control valve to move said steer control valve from said neutral position to one of said side positions, a pair of means each connected to one of said levers at a point spaced from said pivot and to one of said brake operators, a pair of control cams each operating one of said shift valves and one of said means, and having a first position holding said shift valve in said first position, said steer valve in said neutral position and said brake operator in said off position, and being movable to a second position moving said shift valve to said second position and holding said steer valve and said brake operator in the same positions when said cams are moved independently or simultaneously and said cams being movable simultaneously to a third position holding said shift valve in said second position, said steer valve in said neutral position and moving said brake operators to said on positions and each cam being movable independently to said third position to hold the connected shift valve in said second position, the connected brake operator in the on position and to move the steer valve to a side position.

28. In a transmission, a housing, a control valve means having a neutral position and movable to a second position, a shift control valve having a first and a second position, and a brake operator having on and off positions mounted on said housing, a lever centrally pivoted on said housing and having one end operatively connected to said control valve means to move said control valve means from said neutral position to said second position, a floating lever connected to the other end of said lever and to said brake operator, a control cam having means to operate said shift valve and said floating lever, and having a first position holding said shift valve in said first position, said control valve means in said neutral position and said brake operator in said off position, and being movable to a second position moving said shift valve to said second position and holding said control valve and said brake operator in the same position, and said cam being movable to a third position to hold the connected shift valve in said second position, the connected brake operator in the on position and to move said control valve to said second position.

References Cited in the file of this patent

UNITED STATES PATENTS

| | | |
|---|---|---|
| 2,265,078 | Marsh | Dec. 2, 1941 |
| 2,403,579 | Carpenter | July 9, 1946 |
| 2,757,513 | Banker | Aug. 7, 1956 |

UNITED STATES PATENT OFFICE
CERTIFICATE OF CORRECTION

Patent No. 2,912,884                        November 17, 1959

Howard W. Christenson et al.

It is hereby certified that error appears in the printed specification of the above numbered patent requiring correction and that the said Letters Patent should read as corrected below.

Column 7, line 50, for "unti" read -- unit --; column 12, line 57, for "14" read -- 144 --; column 14, line 26, for "occur" read -- occurs --; column 17, line 5, strike out "means"; line 13, strike out "said"; line 33, for "shatf" read -- shaft --; column 18, line 1, for "crang" read -- crank --.

Signed and sealed this 5th day of July 1960.

(SEAL)
Attest:

KARL H. AXLINE
Attesting Officer

ROBERT C. WATSON
Commissioner of Patents